United States Patent
Koenig et al.

(10) Patent No.: US 11,425,801 B2
(45) Date of Patent: Aug. 23, 2022

(54) APPARATUS FOR LIFTING GRAPHITE ELECTRODES

(71) Applicant: EXO Technologies LLC, Cedarburg, WI (US)

(72) Inventors: Mark Koenig, Cedarburg, WI (US); James J. Hansen, Jr., Brecksville, OH (US)

(73) Assignee: Exo Technologies LLC, Cedarburg, WI (US)

(*) Notice: Subject to any disclaimer, the term of this patent is extended or adjusted under 35 U.S.C. 154(b) by 385 days.

(21) Appl. No.: 16/751,477

(22) Filed: Jan. 24, 2020

(65) Prior Publication Data
US 2020/0245419 A1 Jul. 30, 2020

Related U.S. Application Data

(60) Provisional application No. 62/796,454, filed on Jan. 24, 2019.

(51) Int. Cl.
*H05B 7/14* (2006.01)
*H05B 7/102* (2006.01)

(52) U.S. Cl.
CPC .................................. *H05B 7/102* (2013.01)

(58) Field of Classification Search
CPC ........ H05B 7/101; H05B 7/102; H05B 7/105; H05B 7/109; H05B 7/14
USPC ................................................ 373/69, 88–93
See application file for complete search history.

(56) References Cited

U.S. PATENT DOCUMENTS

| | | | |
|---|---|---|---|
| 2,458,272 A * | 1/1949 | Jones | H05B 7/14 373/92 |
| 3,046,319 A | 7/1962 | Daley | |
| 4,185,158 A * | 1/1980 | Koga | F27B 3/085 373/92 |
| 4,435,816 A | 3/1984 | Belz et al. | |
| 4,441,190 A * | 4/1984 | Vielstich | H05B 7/101 373/94 |
| 4,495,624 A | 1/1985 | Reimpell et al. | |
| 5,638,398 A * | 6/1997 | Ikitsu | B66C 13/46 373/92 |
| 9,850,105 B1 * | 12/2017 | Schiller | B66C 1/442 |
| 10,028,338 B1 * | 7/2018 | Schiller | G01L 5/24 |
| 2008/0084907 A1 * | 4/2008 | Lehr | H05B 7/101 373/52 |
| 2008/0084909 A1 | 4/2008 | Teeples et al. | |

FOREIGN PATENT DOCUMENTS

WO 2008045697 A2 4/2008

* cited by examiner

*Primary Examiner* — Hung D Nguyen
(74) *Attorney, Agent, or Firm* — Ziolkowski Patent Solutions Group, SC

(57) ABSTRACT

A lift plug for lifting a graphite electrode includes a main body and an insert coupled to one end of the main body, with the insert configured to mate with a graphite electrode to secure the lift plug to the graphite electrode. The lift plug also includes a lifting component coupled to the main body opposite the insert to lift the graphite electrode. The insert comprises a non-graphite material with a coefficient of thermal expansion (CTE) similar to graphite, such that the lift plug expands at a similar rate as the graphite electrode when heated so as to prevent locking at a joint between the lift plug and the graphite electrode.

20 Claims, 5 Drawing Sheets

APPARATUS FOR LIFTING GRAPHITE ELECTRODES

CROSS-REFERENCE TO RELATED APPLICATION

The present invention is a non-provisional of and claims priority to U.S. Provisional Patent Application Ser. No. 62/796,454, filed Jan. 24, 2019, the disclosure of which is incorporated herein by reference in its entirety.

BACKGROUND OF THE INVENTION

Embodiments of the invention relate to lift plugs for use in lifting graphite electrodes in a foundry, steel plant, or smelter, and with electric furnaces of various types, including electric arc furnaces and induction furnaces, for example.

Graphite electrodes are used in the metal industries to melt, refine, and smelt materials in electrothermal furnaces (e.g., electric arc furnaces). The heat needed to melt metals is generated by passing current (typically in excess of 50,000 amperes) through one or a plurality of electrodes, and forming an arc between the electrodes and the metal. Graphite is used to form the electrode, as graphite is one of the only materials available that has both high levels of electrical conductivity and the capability of sustaining the extreme heat generated in such a demanding environment. A typical graphite electrode used in arc furnaces is constructed as an electrode column consisting of a series of individual electrodes joined together (by graphite pins) to form a single column. In this way, as electrodes are consumed during the thermal process, replacement electrodes can be joined to the column to maintain a desired length of the column extending into the furnace.

In operation of an electric arc furnace, graphite electrodes need to be lowered into and lifted out of a crucible in which metals/ingredients are processed. Traditionally, electrodes are often lifted using a lifting device or "lift plug" that screws into the socket of the graphite electrode. In the past, these lift plugs have been made from several known materials. As one example, lift plugs may have previously been made (at least in part) from steel or aluminum. However, if a lift plug made of steel or aluminum is screwed into a hot graphite electrode socket, the steel and aluminum will expand faster than graphite of the electrode, which may cause the lift plug to lock itself into the electrode joint. Thus, upon the lift plug getting hot and locking, it may be very difficult to remove. The lift plug may eventually come free when the electrode and the plug cool to room temperature, but the cooling process may take considerable time. In a worst-case scenario, the lift plug will damage the graphite electrode socket considering steel can expand at nearly 10× the rate of graphite.

As another example, some lift plugs have previously been made in part from graphite. While graphite lift plugs can operate sufficiently in some furnace operations, the graphite material used to manufacture the lift plug is typically purchased from a graphite electrode company. That is, companies that sell graphite lift plugs have typically purchased graphite connecting pins from graphite electrode companies and fabricate them into the inserts needed for the lift plug—with the lift plug then being assembled, load tested, and sold to the metal manufacturers for use with their furnace operation. However, the price of graphite has recently gone up 5-10× due to a worldwide shortage of high-quality needle coke in the graphite electrode industry, and this shortage of graphite has resulted in it being more difficult and cost prohibitive to acquire graphite for the manufacture of lift plugs.

Another drawback of graphite lift plugs is that the graphite is soft, and with repeated use and handling the graphite insert eventually wears out (the threads get worn and damaged after repeated use) and the entire lift plug has to be replaced. Such replacing of graphite lift plugs can occur on a frequent basis, which can be costly to an operator.

Therefore, it would be desirable to design an apparatus for lifting graphite electrodes made from a cost-effective material(s) that provides proper performance and longevity.

BRIEF DESCRIPTION OF THE INVENTION

In accordance with one aspect of the invention, a lift plug configured to lift a graphite electrode is provided. The lift plug includes a main body and an insert coupled to one end of the main body, the insert configured to mate with a graphite electrode to secure the lift plug to the graphite electrode. The lift plug also includes a lifting component coupled to the main body opposite the insert to lift the graphite electrode. The insert comprises a non-graphite material with a coefficient of thermal expansion (CTE) similar to graphite.

In accordance with another aspect of the invention, a lift plug for lifting a graphite electrode includes a main body and a threaded connection fixed at a first end of the main body and mateable with threads of the graphite electrode, the threaded connection comprising a non-graphite material. The lift plug also includes a coupling attached to a second end of the main body opposite the first end for lifting the graphite electrode. The non-graphite material has a coefficient of thermal expansion (CTE) of less than 3 (μm/(m K)) over a range from room temperature to 1000 degrees Fahrenheit.

In accordance with yet another aspect of the invention, a method of manufacturing a lift plug useable for lifting a graphite electrode includes providing a main body comprising a lifting bail and coupling an insert to the main body on an end thereof opposite the lifting bail, the insert configured to mate with a graphite electrode. The insert comprises a non-graphite material with a coefficient of thermal expansion (CTE) similar to graphite, within +/−0 to 1 (μm/(m K)) over a range from room temperature to 1000 degrees Fahrenheit.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENT

Embodiments of the invention relate generally to lifting devices or lift plugs and, more particularly, to a lift plug for lifting graphite electrodes in a foundry or steel plant. While embodiments of the invention set forth in detail here below are directed to a lifting apparatus for use with graphite electrodes in an electric arc furnace (EAF), it is to be understood that embodiments of the invention are equally applicable for use with other types of electric furnaces. For example, the lifting apparatus may be used to lift a graphite column into or out of an induction furnace or a submerged arc furnace, for example. Furthermore, embodiments of the invention may be utilized not only in melting operations, but also in smelting or refining operations, such as a ladle furnace where molten metal is refined both chemically and thermally.

Figure 1:
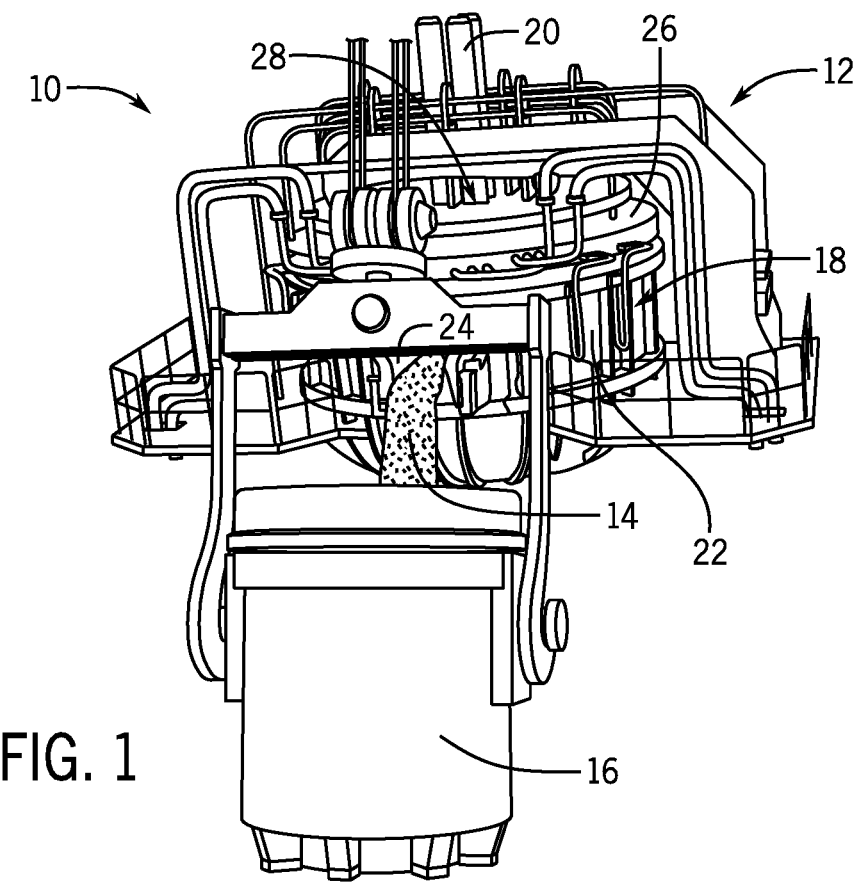
FIG. 1 is a front plan view of an AC electric arc furnace system in or with which embodiments of the invention may be implemented.
Figure 2:
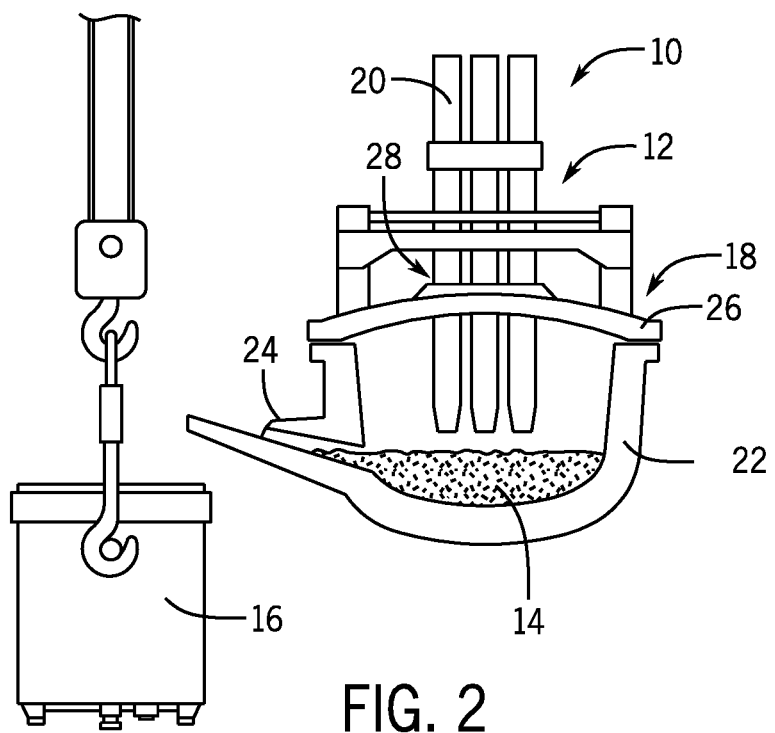
FIG. 2 is a cross-sectional front view of a portion of the AC electric arc furnace system of FIG. 1, according to an embodiment of the invention.

Referring to FIGS. 1 and 2, an AC electric arc furnace system 10 is shown that is useable with embodiments of the invention. In the illustrated embodiment, the AC electric arc furnace system 10 includes an AC electric arc furnace 12 for heating and melting a desired material 14 and a ladle 16 into which molten material may be poured.

The AC electric arc furnace 12 includes a refractory-lined melting vessel 18 that holds a material to be melted and one or more electrodes 20 (such as the three electrodes shown in FIGS. 1 and 2) used to heat and melt the material in the vessel 18. Each of the electrodes 20 is formed of a graphite material that has both high levels of electrical conductivity and the capability of sustaining extreme heat generated in operation of the AC electrical arc furnace 12. The electrodes 20 may be round in section and formed in segments that may be joined together, so that as the electrodes 20 wear, new segments can be added.

The refractory-lined melting vessel 18 includes a lower hearth 22 that holds the material 14 to be melted, with a tap spout 24 included in the lower hearth 22 that allows molten material 14 to be poured out from the lower hearth 22. A roof 26 is positioned over the lower hearth 22 that is removable therefrom. The roof 26 includes openings 28 formed therein through which electrodes 20 may positioned and lowered down into the lower hearth 22.

In operation of electric arc furnace system 10, material 14 (e.g., scrap metal, alloys, fluxes, ore) may be loaded into the lower hearth 22 of refractory-lined melting vessel 18. After loading of the material 14, the roof 26 is positioned over the lower hearth 22 and meltdown or refining of the material 14 commences. The electrodes 20 are lowered into the material 14 and an arc is struck between the charged material 14 and the electrodes 20, with electrical phase currents in excess of 50,000 amperes typically used to strike the arc. Lower voltages may be selected for this initial part of the operation to protect the roof 26 and walls of lower hearth 22 from excessive heat and damage from the arcs. Once the electrodes 20 have reached a heavy melt at the base of the lower hearth 22 and the arcs are shielded by the material 14, the voltage can be increased and the electrodes 20 raised slightly, lengthening the arcs and increasing power to the material 14. During melting, the electric arc temperature reaches around 3000° C. (5000° F.), thus causing the lower sections of the electrodes 20 to glow incandescently when in operation. Once the material 14 has completely melted down and a temperature and chemistry of the material is correct, the molten material 14 is tapped out into preheated 16 ladle through tilting of the AC electric arc furnace 12 (i.e., tilting of refractory-lined melting vessel 18).

In operation of electric arc furnace system 10, it is necessary to transport the graphite electrodes 20 to/from the system, and to selectively raise and lower electrodes 20 from the melting vessel 18. For providing for such transporting and movement of the electrodes 20, a lifting adaptor 100 is provided that is mateable with the electrodes 20 and by which a translating mechanism, such as an overhead gantry or winch (FIG. 7), may be connected to the electrode 20, to provide for movement thereof. The lifting adaptor 100 may be any suitable adaptor or connector for lifting a graphite column, including a lift plug 104 as shown and described in FIGS. 3-8, and ideally is left connected to the electrode 20 during operation of the electric arc furnace system 10 and heating of the electrode 20. According to embodiments of the invention, the lifting adaptor 100 (i.e., lift plug 104) includes one or more components or parts that are composed of a material that has a coefficient of thermal expansion (CTE) similar to graphite, as will be described in more detail hereafter. A lifting adaptor 100 made from a material with a CTE similar to graphite will expand at a similar rate as the graphite column when heated, which will prevent locking at the joint between the lifting adaptor 100 and the graphite column.

Figure 3:
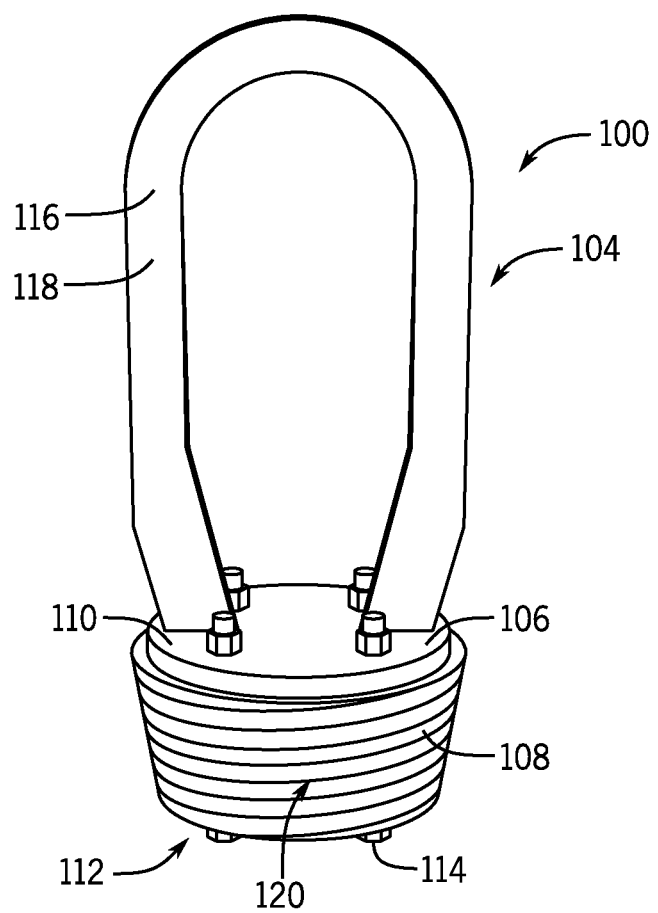
FIG. 3 is a side top perspective view of a lift plug for lifting graphite electrodes, according to an embodiment of the invention.
Figure 4:
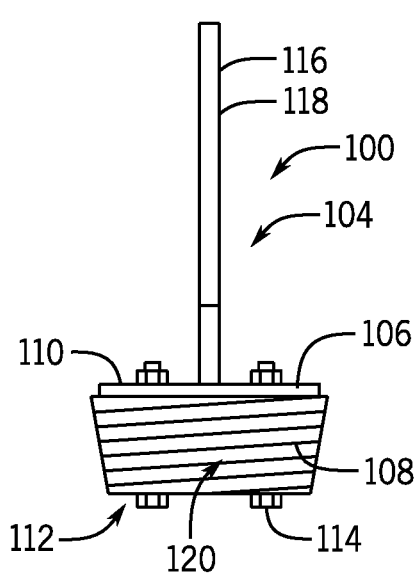
FIG. 4 is a side view of the lift plug for lifting graphite electrodes of FIG. 3, according to an embodiment of the invention.
Figure 5:
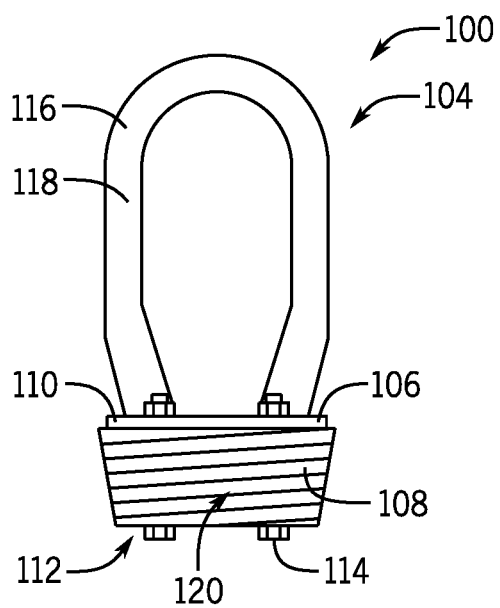
FIG. 5 is a side view of the lift plug for lifting graphite electrodes of FIG. 4 shown 90 degrees from the side view of FIG. 4, according to an embodiment of the invention.

Referring to FIGS. 3-5, a lifting adaptor 100 is shown as a lift plug 104, in accordance with an embodiment of the invention. The lift plug 104 is preferably configured to lift a graphite electrode. The lift plug 104 may comprise a main body 106 and an insert 108 coupled to one end of the main body 106. The insert 108 is generally configured to mate with a graphite electrode to secure the lift plug 104 to the graphite electrode. The insert 108 may be manufactured from a "connecting pin" typically used to join two graphite electrode segments together, e.g. where graphite electrodes are continuously fed into the furnace. The insert 108 may be coupled between a first plate 110 and a second plate 112 of the main body 106 by a plurality of fasteners 114. Alternatively, the insert 108 may be an integral component of the main body 106. The insert 108 may comprise a material with a CTE similar to graphite, as will be explained in more detail with respect to FIG. 6. A lifting component 116 is shown coupled to the main body 106 opposite the insert 108 to lift a graphite electrode coupled to the lift plug 104. The lifting component 116 may comprise a lifting handle (commonly referred to as a "lifting bail") 118. According to an exemplary embodiment, the insert 108 may have threads 120 that mate with corresponding threads on the graphite electrode 20 (FIGS. 1 and 2) to secure the lift plug 104 to the electrode.

Figure 6:
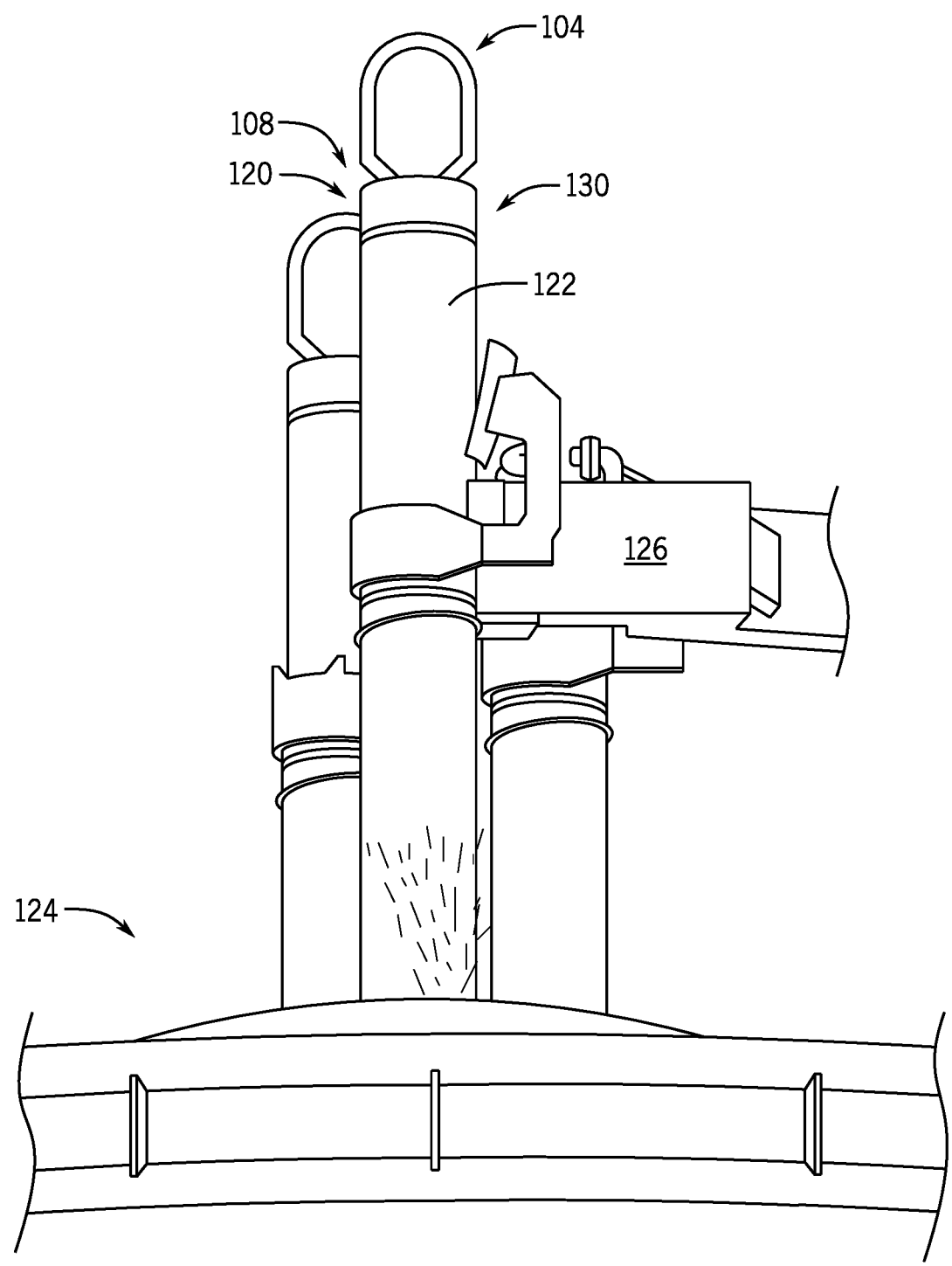
FIG. 6 is a perspective side view of graphite electrodes, each with a lift plug coupled to a top end thereof, and positioned relative to an AC electric arc furnace, according to an embodiment of the invention.

Referring now to FIG. 6, a lift plug 104 coupled to a graphite electrode 122 (i.e., a graphite column) of an AC electric arc furnace 124 (similar to the furnace 12 of FIGS. 1 and 2) is shown, according to an embodiment of the invention. The graphite electrode 122 may be used on an AC electric arc furnace 124 in a shop or foundry or steel plant, with the furnace having a graphite electrode holder 126, also referred to as a graphite column holder, positioned above the electric furnace.

The lift plug 104 includes a threaded end 120 that screws into a socket 130 of the graphite electrode 122 having the mating threads. The lift plug 104 allows an overhead crane (or gantry crane) to pull the graphite electrodes 122 in and out of the AC electric arc furnace 124 (and transport them therefrom) and handle the electrodes when they are in use, with it thus recognized that the temperature of the lift plug 104 will increase when coupled to a hot electrode.

According to an exemplary embodiment of the invention, the lift plug 104 uses an insert 108 made of a non-graphite material having a coefficient of thermal expansion (CTE or a) that is similar to that of the graphite electrode 122. The non-graphite material has a CTE of less than 3 (μm/(m K)) over a range from room temperature to 1000 degrees Fahrenheit, as compared to graphite having a CTE of around 1-2 at these temperatures. Thus, as the CTE of the non-graphite material from which insert 108 is formed is similar to the CTE of graphite, that is, within +/−1 (μm/(m K)) over a range from room temperature to 1000 degrees Fahrenheit, the insert 108 will not expand faster, or significantly faster, than the graphite electrode 122 when the lift plug 104 is screwed into the graphite electrode 122. Thus, the chance of the lift plug 104 locking itself into the joint/socket 130 of the graphite electrode 122 may be eliminated, such that the lift plug 104 can be easily removed from the graphite electrode 122.

According to an exemplary embodiment of the invention, the non-graphite material from which insert 108 is formed is a nickel-iron alloy that contains approximately 30-36% Nickel, which may typically be referred to as Invar or a variant of Invar. Invar is a nickel-iron alloy known generically as FeNi36, or 64FeNi (Invar 36) in the U.S., and there are several other variants of Invar having a composition of roughly 30-36% nickel that can use subtle additions of other alloys (e.g., cobalt) to improve machinability or slightly modify the metallurgical properties. Examples of Invar variants include (but are not limited to) Super Invar 32-5 (FeNi31Co5) and Inovco (FeNi33Co4.5), for example. It is thus understood that embodiments of the invention encompass lifting plug inserts 108 made from the above referenced Invar alloys, and it is also envisions that other Invar alloys, alloys, and/or non-metallic materials that exhibit similar CTE, hardness, and/or strength characteristics as these Invar alloys are considered to be within the scope of the invention and suitable for use in lifting plug inserts 108 for use with graphite electrodes 122. Accordingly, embodiments of the invention use Invar or a variant of it for the purpose of replacing graphite in a lift plug 104 for a graphite electrode 122. This very stable metallic material may be substituted for the traditionally used graphite or steel in lift plugs 104 for lifting graphite electrodes 122.

Figure 7:
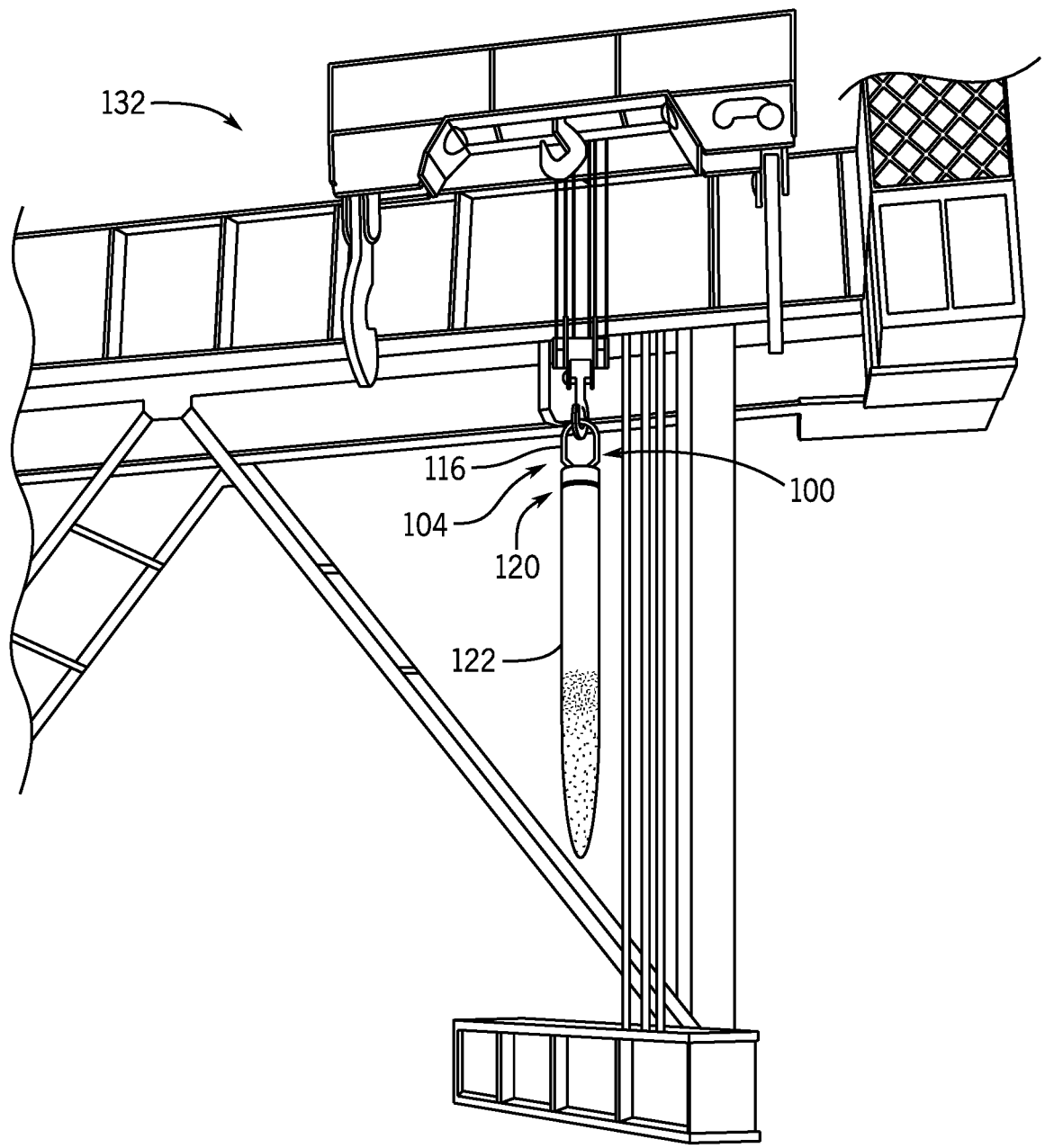
FIG. 7 is a side view of an overhead crane lifting a graphite electrode via a lift plug, according to an embodiment of the invention.

Referring now to FIG. 7, an overhead crane 132 is shown lifting a graphite electrode 122 by a lifting adaptor 100 (e.g. lift plug 104), according to an embodiment of the invention. The overhead crane 132 provides a system for mounting/positioning the graphite electrode 122 in an electric arc furnace 124 (FIG. 6), with the electric furnace comprising a graphite electrode holder 126 (FIG. 6) to position the graphite electrode 122 operably in the electric furnace. The system further includes the lifting adaptor 100 comprising a lifting mechanism 116 to lift the lifting adaptor 100, and a threaded end 120 coupled to the lifting mechanism 116, with the threaded end 120 mating with a threaded socket formed in the graphite electrode 122. As previously described, the threaded end 120 may be composed/formed of a non-graphite material having desirable CTE and hardness characteristics, with the threaded end 120 being formed of an Invar alloy or variant thereof, according to an exemplary embodiment. The overhead crane 132 receives the lifting mechanism 116 and can position the graphite electrode 122 in the graphite electrode holder 126 (FIG. 6).

Figure 8:
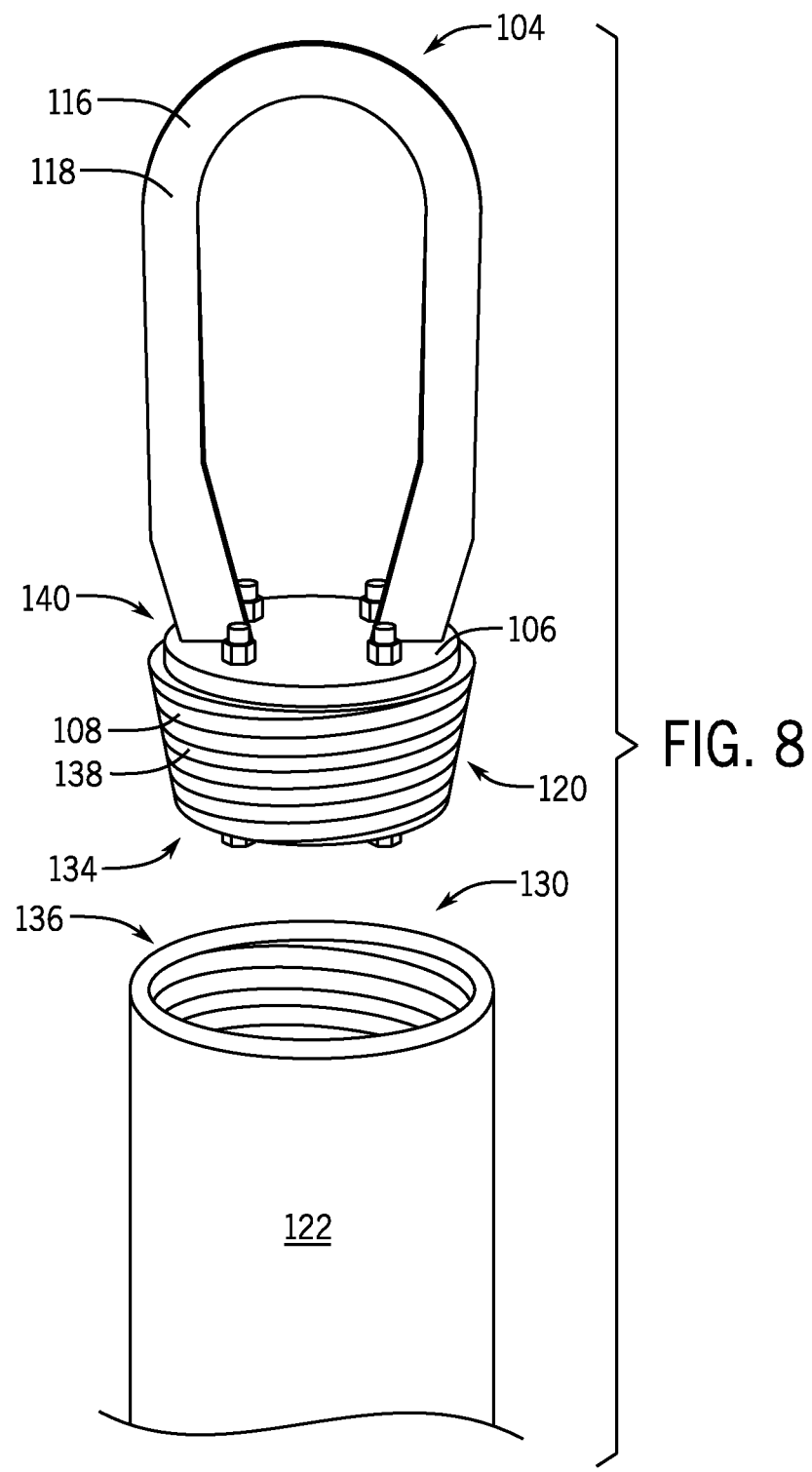
FIG. 8 is an upper partial perspective view of a graphite electrode with a lift plug exploded therefrom, according to an embodiment of the invention.

Referring now to FIG. 8, a graphite electrode 122 having threaded socket 130 for receiving a threaded end 120 of a lift plug 104, is shown according to an embodiment of the invention. As referred to previously, the lift plug 104 comprises a main body 106 and a threaded connection 120 fixed at a first end 134 of the main body 106. The threaded connection 120 comprises threads of a non-graphite material to mate with threads 136 of the graphite electrode 122, with the non-graphite material having a CTE similar to the graphite electrode 122. In some embodiments, the lift plug 104 comprises an insert 108 coupled to the main body 106 with the insert 108 comprising a threaded insert 138 to screw into a threaded socket 130 of the graphite electrode 122. As referred to previously, the threaded connection 120 of the lift plug 104 may be formed of an Invar alloy having a CTE similar to a CTE of the graphite column up to 300-400 degrees Fahrenheit, or beyond (i.e., up to 1000 Fahrenheit). The lift plug 104 and the socket 130 may have any suitable number of threads per inch. According to some embodiments, the lift plug 104 and the socket 130 may have 2, 3, or 4 threads per inch. A coupling 116 (e.g. lifting bail 118) is shown attached to a second end 140 of the main body 106 opposite the first end 134 to lift the graphite electrode 122.

Beneficially, embodiments of the invention provide a lifting adaptor coupleable to a graphite column for positioning the column in an electric furnace. The lifting adaptor may comprise a main body having a threaded connection or insert fixed at a first end of the main body. The threaded connection is composed of a non-graphite material having a CTE similar to the graphite column, with an Invar alloy or variant of Invar being used for the threaded connection according to exemplary embodiments. The lifting adaptor may also include a coupling attached to a second end of the main body opposite the first end to lift the graphite column. The coupling may include a lifting bail attachable to an overhead crane to lift the graphite column into and/or out of the electric furnace.

Therefore, according to one embodiment, a lift plug configured to lift a graphite electrode is provided. The lift plug includes a main body and an insert coupled to one end of the main body, the insert configured to mate with a graphite electrode to secure the lift plug to the graphite electrode. The lift plug also includes a lifting component coupled to the main body opposite the insert to lift the graphite electrode. The insert comprises a non-graphite material with a coefficient of thermal expansion (CTE) similar to graphite.

According to another embodiment, a lift plug for lifting a graphite electrode includes a main body and a threaded connection fixed at a first end of the main body and mateable with threads of the graphite electrode, the threaded connection comprising a non-graphite material. The lift plug also includes a coupling attached to a second end of the main body opposite the first end for lifting the graphite electrode. The non-graphite material has a coefficient of thermal expansion (CTE) of less than 3 (μm/(m K)) over a range from room temperature to 1000 degrees Fahrenheit.

According to yet another embodiment, a method of manufacturing a lift plug useable for lifting a graphite electrode includes providing a main body comprising a lifting bail and coupling an insert to the main body on an end thereof opposite the lifting bail, the insert configured to mate with a graphite electrode. The insert comprises a non-graphite material with a coefficient of thermal expansion (CTE) similar to graphite, within +/−0 to 1 (μm/(m K)) over a range from room temperature to 1000 degrees Fahrenheit.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A lift plug configured to lift a graphite electrode, the lift plug comprising:
a main body;
an insert coupled to one end of the main body, the insert configured to mate with a graphite electrode to secure the lift plug to the graphite electrode; and
a lifting component coupled to the main body opposite the insert to lift the graphite electrode;
wherein the insert comprises a non-graphite material with a coefficient of thermal expansion (CTE) similar to graphite.

2. The lift plug of claim 1 wherein the non-graphite material comprises a nickel-iron alloy that contains approximately 30-36% Nickel.

3. The lift plug of claim 2 wherein the nickel-iron alloy comprises FeNi36.

4. The lift plug of claim 2 wherein the nickel-iron alloy comprises FeNi31Co5 or FeNi33Co4.5.

5. The lift plug of claim 1 wherein the non-graphite material has a CTE of less than 3 (μm/(m K)) over a range from room temperature to 1000 degrees Fahrenheit.

6. The lift plug of claim 1 wherein the non-graphite material has a CTE of approximately 1-1.5 (μm/(m K)) at room temperature and a CTE of approximately 2 (μm/(m K)) between 300-400 degrees Fahrenheit.

7. The lift plug of claim 1 wherein the insert comprises a threaded insert to screw into a threaded socket of the graphite electrode.

8. The lift plug of claim 1 wherein the lifting component comprises a lifting bail.

9. A lift plug for lifting a graphite electrode comprising:
a main body;
a threaded connection fixed at a first end of the main body and mateable with threads of the graphite electrode, the threaded connection comprising a non-graphite material; and
a coupling attached to a second end of the main body opposite the first end for lifting the graphite electrode;
wherein the non-graphite material has a coefficient of thermal expansion (CTE) of less than 3 (μm/(m K)) over a range from room temperature to 1000 degrees Fahrenheit.

10. The lift plug for lifting a graphite electrode of claim 9 wherein the non-graphite material comprises a nickel-iron alloy that contains approximately 30-36% Nickel.

11. The lift plug for lifting a graphite electrode of claim 10 wherein the nickel-iron alloy comprises FeNi36.

12. The lift plug for lifting a graphite electrode of claim 10 wherein the nickel-iron alloy comprises FeNi31Co5 or FeNi33Co4.5.

13. The lift plug for lifting a graphite electrode of claim 9 wherein the main body comprises a first plate and a second plate, and wherein the threaded connection is positioned between and secured to the first plate and the second plate.

14. The lift plug for lifting a graphite electrode of claim 9 wherein the non-graphite material has a CTE of approximately 1-1.5 (μm/(m K)) at room temperature and a CTE of approximately 2 (μm/(m K)) between 300-400 degrees Fahrenheit.

15. A method of manufacturing a lift plug useable for lifting a graphite electrode, the method comprising:
providing a main body comprising a lifting bail; and
coupling an insert to the main body on an end thereof opposite the lifting bail, the insert configured to mate with a graphite electrode;
wherein the insert comprises a non-graphite material with a coefficient of thermal expansion (CTE) similar to graphite, within +/−0 to 1 (μm/(m K)) over a range from room temperature to 1000 degrees Fahrenheit.

16. The method of claim 15 wherein the non-graphite material is a nickel-iron alloy that contains approximately 30-36% Nickel.

17. The method of claim 16 wherein the nickel-iron alloy comprises FeNi36.

18. The method of claim 16 wherein the nickel-iron alloy comprises FeNi31Co5 or FeNi33Co4.5.

19. The method of claim 15 further comprising forming a plurality of threads on the insert to enable the insert to be screwed into a threaded socket of the graphite electrode.

20. The method of claim 15 wherein providing the main body comprises providing a main body having a first plate and a second plate, and wherein coupling the insert to the main body comprises securing the insert between the first plate and the second plate, via a plurality of connection pins.

* * * * *

UNITED STATES PATENT AND TRADEMARK OFFICE
CERTIFICATE OF CORRECTION

| | | |
|---|---|---|
| PATENT NO. | : 11,425,801 B2 | Page 1 of 1 |
| APPLICATION NO. | : 16/751477 | |
| DATED | : August 23, 2022 | |
| INVENTOR(S) | : Koenig et al. | |

It is certified that error appears in the above-identified patent and that said Letters Patent is hereby corrected as shown below:

In the Specification

Column 5, Line 16, delete "a)" and substitute therefore -- α) --.

Signed and Sealed this
First Day of November, 2022

*Katherine Kelly Vidal*

Katherine Kelly Vidal
*Director of the United States Patent and Trademark Office*